Patented June 15, 1926.

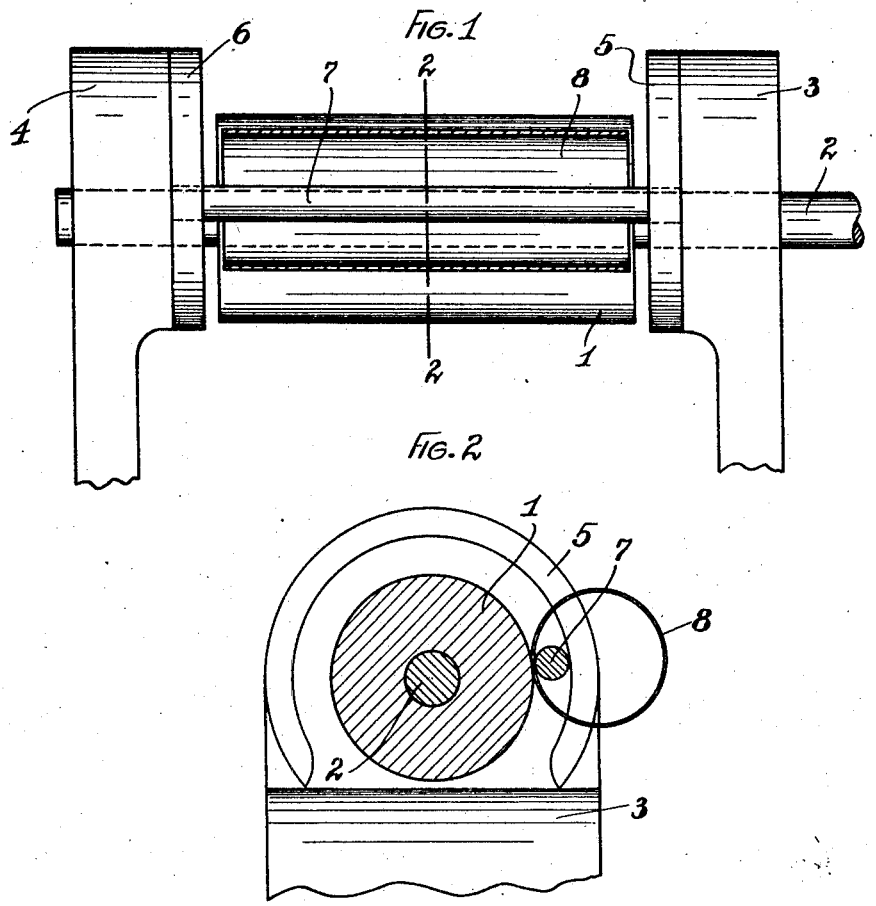

1,588,819

UNITED STATES PATENT OFFICE.

ARTHUR WILBUR SPAULDING, OF OAKLAND, CALIFORNIA.

MACHINE FOR MAKING SEAMLESS CANS.

Application filed March 17, 1923. Serial No. 625,918.

The present invention relates to improvements in a method of and machine for increasing the diameter of a metal tube and has particular reference to seamless cans, which are particularly adapted to be used in my machine, and according to the method hereinafter described. It is particularly proposed in the present invention to confine a peripheral section of the tube to be enlarged between two rollers and to impart revolving motion to one of the same whereby the thickness of the material is reduced and a corresponding enlargement of the tube obtained.

It is further proposed to provide for this purpose one large roller which turns on a stationary axis and a smaller roller or mandrel which is guided to travel along the periphery of the large roller in a planetary manner.

Further objects of my invention will appear as the specification proceeds.

In the drawing in which my invention is illustrated:

Fig. 1 is a side view partly in section of my can forming machine.

Fig. 2 is a sectional view taken on the line 2—2 of Fig. 1.

Referring more particularly to the drawing, a roller 1 is secured to a shaft 2 which is journaled in the brackets 3 and 4.

Arcuate guides 5 and 6 are secured to the brackets 3 and 4 respectively adjacent the ends of the roller 1. A mandrel 7 is adapted to extend across the roller 1 and under the guides 5 and 6.

The can is formed in the following manner, a piece of seamless tubing 8 is cut to the proper length to extend across the roller 1. The mandrel 7 is placed through the tubing 8 and under the guides 5 and 6. Suitable power is applied to the shaft 2 to rotate the roller 1 and the mandrel 7 and tube 8 are slowly moved around the periphery of the roller in the guides 5 and 6. The guides are so spaced from the periphery of the roller that the mandrel will exert a constant pressure against the tube which is in contact with the roll, the walls of the tube will thus become thinner and the tube will become greater in diameter, thus forming a can of the proper size and weight. The can now has a head placed thereon in the usual machine.

Having described my invention I claim:

An apparatus for rolling or enlarging the diameter of seamless tubes comprising a roll of large diameter, a mandrel of small diameter parallel thereto, said roll and mandrel being spaced to engage the inside and outside periphery of a tube, a pair of arcuate guides engaging the opposite ends of the mandrel and means to rotate the large roll and thereby draw the tube between the large roll and the mandrel and actuate the mandrel to follow the arcuate guides.

In testimony whereof I affix my signature.

ARTHUR WILBUR SPAULDING.